United States Patent [19]
Bjorklund

[11] 4,166,254
[45] Aug. 28, 1979

[54] SWITCHED DIFFRACTION GRATING

[75] Inventor: Gary C. Bjorklund, West Windsor, N.J.

[73] Assignee: Bell Telephone Laboratories, Incorporated, Murray Hill, N.J.

[21] Appl. No.: 838,859

[22] Filed: Oct. 3, 1977

[51] Int. Cl.² ............................................. H01S 3/11
[52] U.S. Cl. .......................... 331/94.5 C; 331/94.5 M; 331/94.5 Q; 350/354
[58] Field of Search ................... 350/162; 331/94.5 C, 331/94.5 F, 94.5 M

[56]  References Cited
  U.S. PATENT DOCUMENTS

| | | | |
|---|---|---|---|
| 3,578,845 | 5/1971 | Brooks et al. ...................... | 350/162 R |
| 3,991,386 | 11/1976 | Bjorklund et al. ............... | 331/94.5 F |
| 4,040,718 | 8/1977 | Bjorklund et al. ................ | 350/147 |
| 4,115,747 | 9/1978 | Sato et al. ......................... | 331/94.5 M |

OTHER PUBLICATIONS

Motoki, Low Voltage Optical Modulator Using Electrooptically Induced Phase Gratings, Applied Optics, vol. 12, No. 7 (Jul. 1973), pp. 1472-1476.
Wilson et al, Nanosecond Baseband Optical-Diffraction Modulator, Electronics Letters, vol. 7, No. 10 (May 1971), pp. 267-269.
Siegman, Proposed Picosecond Excited-State Measurement Method Using a Tunable-Laser-Induced Grating, Appl. Phys. Lett., vol. 30, No. 1 (Jan. 1, 1977), pp. 21-23.

*Primary Examiner*—William L. Sikes
*Attorney, Agent, or Firm*—Daniel D. Dubosky

[57] ABSTRACT

A switchable diffraction grating may be formed from an array of color centers in an alkali halide crystal. These gratings will diffract only when the color centers are excited by an external light source, so that they may be switched on and off. The gratings may be used to form optical switches, pulse shaping devices, and Q-switched lasers.

10 Claims, 5 Drawing Figures

SWITCHED DIFFRACTION GRATING

BACKGROUND OF THE INVENTION

Optical switching elements have been sought for some time, and a variety of different techniques have been proposed. For example, U.S. Pat. No. 4,040,718 issued to G. C. Bjorklund et al on Aug. 8, 1977 employs the dispersion caused by a two-photon transition to rotate a polarized beam of light between crossed polarizers.

Color centers in crystals have been used to generate light in a distributed feedback laser, but not to switch or to diffract radiation of a wavelength different from that generated by the color centers. (See U.S. Pat. No. 3,991,386 issued to G. C. Bjorklund et al on November 9, 1976, incorporated herein by reference.)

SUMMARY OF THE INVENTION

The invention relates to a diffraction grating that may be switched by an external pump so that it transmits radiation of a certain wavelength when the elements that form the grating are in the ground state, and diffracts that radiation when the elements are in an excited state.

A switchable diffraction grating constructed in accordance with the present invention may be utilized for changing the direction of an incident beam of radiation, for shaping a pulse of radiation and for Q-switching a laser.

DETAILED DESCRIPTION

It is well known in the art that alkali halide crystals exhibit transparency over a wide range of the electromagnetic spectrum from the vacuum ultraviolet to the middle infrared, and that the addition of color centers to an alkali halide crystal introduces a strong absorption band in the visible. For example, $F_A(II)$ centers in KCl induce an absorption band centered at about 5500 Angstroms. The change in index of refraction of the crystal produced by the absorption band will be most pronounced, of course, near the absorption band and will reduce to a limiting but still finite value at wavelengths far from the absorption band.

The key to the present invention lies in the recognition that the color centers may be excited from the ground state to another state with different frequency characteristics, so that it is possible, for example, to fabricate an array of color centers spaced according to the well-known Bragg formula to diffract 10 micron radiation, which array will diffract a negligible amount of radiation (less than 1 percent) when the color centers are in the ground state because the index of refraction change at that wavelength is extremely small. When the color centers are in a relaxed excited state, however, the absorption peak in the visible is replaced by an emission peak in the infrared (in the range of 1–3 microns) and the index of refraction change at 10 microns produced by the color centers is increased so that most of the incident 10 micron radiation is diffracted. This array of color centers then forms a switchable diffraction grating, with a variety of uses. Since it is known to produce holographically many diffraction grating patterns (see U.S. Pat. No. 3,578,845 issued to R. E. Brooke et al on May 18, 1971), diffraction gratings that have color centers arrayed in spherical shells and are thereby capable of focusing light can be made according to the invention.

Figure 1:
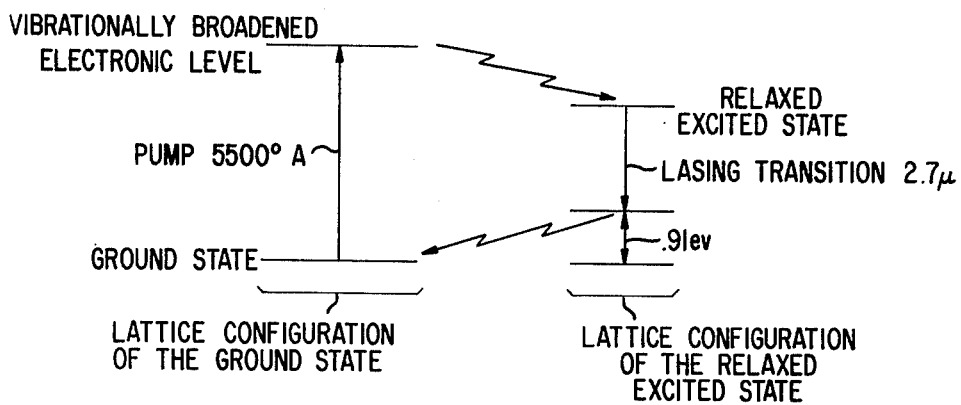
FIG. 1 illustrates the quantum levels involved in one embodiment of the invention.

In the drawings, FIG. 1 illustrates relevant energy levels of an $F_A(II)$ color center in a KCl crystal. The color center is pumped by a laser beam at 5500 Angstroms, to a vibrationally broadened excited electronic level in the lattice configuration of the ground state quickly decaying by a nonradiative transition to a relaxed excited state with a long lifetime as the lattice shifts to its relaxed configuration. The color center eventually decays via a radiative (lasing) transition to a ground state about 0.91 ev above the ground level and then by a nonradiative transition to the ground state. The particular radiative transition illustrated happens to be at a wavelength of 2.7 microns, but that value is not important. The radiative transitions of color centers lie between vibrational bands that are separated in energy by amounts that correspond to wavelengths between 1 and 3 microns and many different excited states are available as well as many different choices for location of the pump bands.

When color centers are added to an alkali halide crystal, the index of refraction of the crystal is altered over a wide frequency range. The change in index of refraction $\Delta n$, caused by the color centers is given as a function of wavelength $\lambda$ by:

$$\Delta n = \frac{N}{2\pi} \frac{r_e f_o}{\left(\frac{1}{\lambda_o^2} - \frac{1}{\lambda^2}\right)} \qquad (1)$$

where $N$ is the number density of color centers per cubic centimeter, typically $10^{17}/cm^3$, $r_e$ is equal to $2.818 \times 10^{-13}$ cm, $\lambda_o$ is the center wavelength of the perturbation band, the band of frequencies within which optical gain or loss occurs and $f_o$ is the oscillator strength of the perturbation band, taken to be $+1$ for absorption and $-1$ for emission.

For a wavelength that is long compared with the wavelength of the absorption band, the term in $\lambda$, in Equation 1 drops out and (for color centers in the ground state) $\Delta n$ approaches a limiting value $$\Delta n \to +1.4 \times 10^{-5}.$$

The diffraction efficiency $\epsilon$ of a thick Bragg grating with a sinusoidal modulation of index of refraction is $$\epsilon = \sin\left[\left(\frac{\pi \Delta n\, T}{\lambda \cos \Theta_o}\right)\right]^2 \quad (2)$$

where

T is the thickness of the grating, taken to be 1 cm,
λ is the incident wavelength,
$\theta_o$ is the Bragg angle of incidence, and
Δn is computed from Equation (1).

Taking the above example with $\lambda = 10\,\mu$ and $\cos \theta_o = 1$, we calculate $\epsilon = 1.9 \times 10^{-3}$, confirming the previous statement that the radiation diffracted is less than 1 percent when the color centers are in the ground state.

When the color centers are in the relaxed excited state, there is an emission band centered at 2.7μ, Δn becomes $-3.3 \times 10^{-4}$, since the emission band has an oscillator strength of $-1$, and ε becomes 86 percent, confirming that most of the radiation is diffracted.

Figure 2:
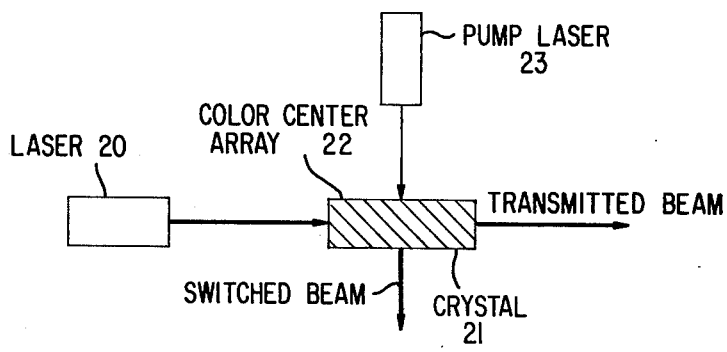
FIG. 2 illustrates an embodiment in which a diffraction grating switches a beam under the control of a pump laser.

An embodiment of the invention is illustrated in FIG. 2, in which laser 20 emits a beam of infrared radiation, illustratively at a wavelength of 10 microns. (The infrared beam is indicated by a heavy line in this and the following figures.) The beam strikes crystal 21, illustratively a KCl crystal containing a thick diffraction grating composed of an array of parallel planes of $F_A(II)$ color centers, oriented at an angle of 45 degrees with respect to the incident beam and spaced according to Bragg's law for the radiation at 10 microns. (It is conventional in the art to refer to the angle between the incident beam and the plane of the grating.) Crystal 21 is maintained at a temperature of less than about −70 degrees Centigrade by conventional refrigeration means, well-known to those skilled in the art and omitted from the drawing for the sake of clarity.

When the color centers are in the ground state, the incident beam passes through the crystal. When the color centers are excited to the relaxed excited state by a beam from pump laser 23, the incident beam is diffracted by 90 degrees. This apparatus will diffract the incident beam as long as pump 23 maintains a population of color centers in the relaxed excited state. When the pump is turned off, the color centers will decay to the ground state with their natural time constant (illustratively 100 nanoseconds) and the infrared beam will again pass through the crystal. The color centers could be excited by any other source of radiation instead of a laser, of course.

The planes of color centers in FIG. 2 are at an angle of 45 degrees with respect to the incident beam and with respect to the crystal axis. This orientation may be effected by taking a crystal with color center planes parallel to the ground axis and tilting it, by tilting the crystal in the apparatus shown in FIG. 2 of U.S. Pat. No. 3,991,386, or by altering the angle of the light beams reflected by mirrors 25 and 26 of FIG. 2 of U.S. Pat. No. 3,991,386 in a manner obvious to one skilled in the art, or by forming a thick crystal as shown in FIG. 2 of U.S. Pat. No. 3,991,386 and cutting a new crystal from it with the color center planes at a desired angle with respect to the new crystal axis.

Figure 3:
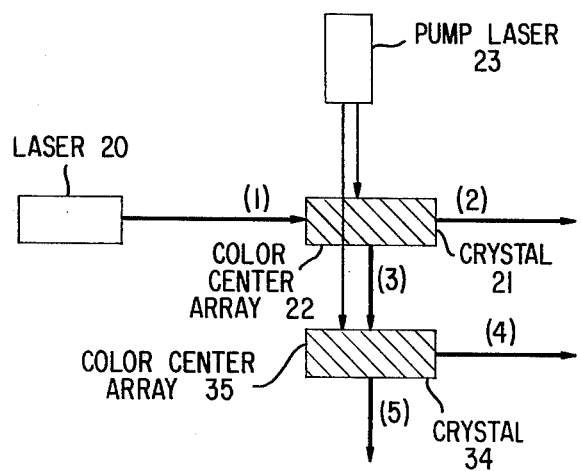
FIG. 3 illustrates an embodiment in which a pair of crystals shape a pulse of radiation.

FIG. 3 illustrates an apparatus that shapes an incident pulse of radiation or that forms a pulse from a continuous beam. Laser 20 generates an incident beam 1 at 10 microns, which strikes crystal 21, containing an array of color centers 22. When the color centers 22 are in the ground state, the incident beam passes through the crystal without significant attenuation, emerging as beam 2. When color centers 22 are excited by pump 23, the incident beam is deflected, forming beam 3 at right angles to the direction of beam 1. Beam 3 strikes crystal 34 containing an array of color centers 35, oriented to diffract beam 3 at a right angle when they are excited. When color centers 35 are in the ground state, beam 3 passes through crystal 34, emerging as beam 5. When color centers 35 are excited, beam 3 is diffracted by a right angle and emerges as beam 4. Color centers 35 are illustratively excited by another beam from pump 23, which is guided by a conventional mirror arrangement that is not shown for better clarity in the drawing. The optical path lengths of the beams from pump 23 to crystals 21 and 34 are arranged so that crystal 34 is excited a predetermined time after crystal 21. Beam 5 is the output beam of the apparatus. Its leading edge is controlled by crystal 21, its length by the delay between the excitation of crystal 21 and the excitation of crystal 34, and its trailing edge by the excitation of crystal 34. It is preferable, for the sharpest rise and fall times, to have the pump propagate through the crystal in the same direction as the switched beam as is shown in FIG. 2. In place of the conventional mirror arrangement discussed above, it is also possible to use two pump lasers triggered by conventional means, so that the desired delay between the excitation of crystal 21 and of crystal 34 is produced.

Figure 4:
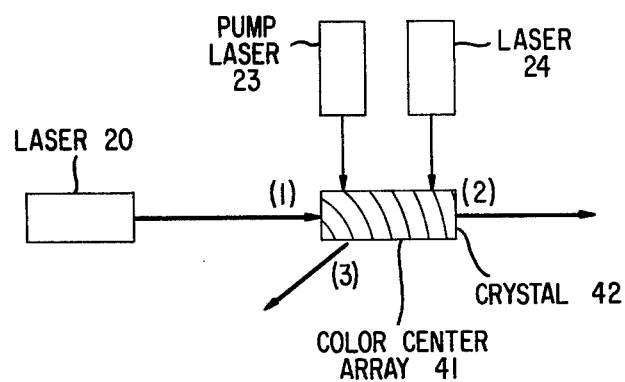
FIG. 4 illustrates an embodiment in which a pump laser and an eraser lamp are used to shape a pulse of radiation.

Another embodiment of the invention is illustrated in FIG. 4, in which laser 20 generates beam 1 which is diffracted by color center array 41 of crystal 41 to form beam 3 when color center array 41 is pumped by pump laser 23. The trailing edge of beam 3 is shaped by a pulse from eraser laser 24, which is set to the frequency associated with the relaxed excited state being used in the apparatus. With laser 23 turned off after exciting the color centers, eraser laser 24 is triggered by conventional means not shown to irradiate the crystal a predetermined time after the color centers have been excited. This radiation causes the color centers to decay to the ground state by the process of stimulated emission in a time short compared with their natural decay time, thus turning off beam 3 sharply. In this embodiment, color center array 41 is composed of an array of curved surfaces, so that beam 3 is not parallel, but is focused to a point. Methods of forming holographic diffraction gratings that focus the light which they process are well known in the art (e.g., see U.S. Pat. No. 3,578,845 referred to above).

Figure 5:
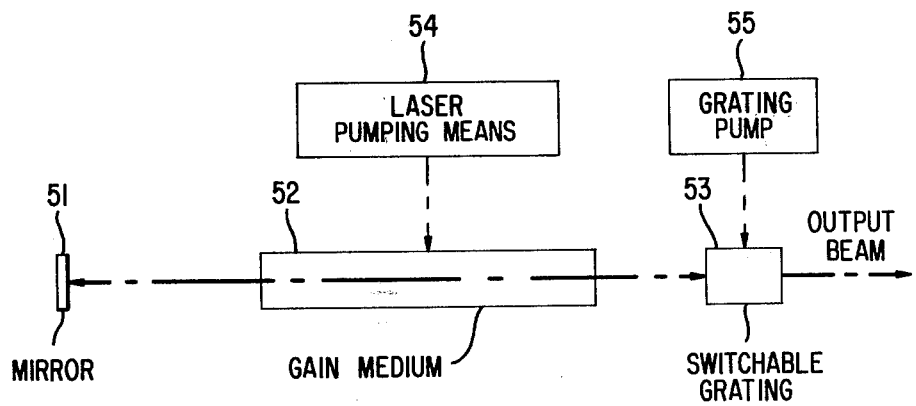
FIG. 5 illustrates a Q-switched laser in which the switching is done by a grating according to the invention.

Another use of the invention is in an optically controlled Q-switched laser. FIG. 5 illustrates a laser in which the resonant cavity is formed by mirror 51, gain medium 52 and switchable diffraction grating 53. Gain medium 52, illustratively a vessel containing $CO_2$ is excited by pumping means 54, illustratively an electric discharge apparatus. Other gain media and optical pumping could be used, of course. Switchable grating 53 remains in the ground state while energy is stored in gain medium 52 and, since grating 53 does not reflect radiation back into gain medium 52, there is no lasing action. Grating pump 55 excites grating 53 at a predetermined time, and lasing action commences in the cavity, with radiation escaping through grating 53.

The description of the invention has been in the context of a diffraction grating that diffracts when the elements forming the grating are in an excited state. It is also possible to have a grating that diffracts when the color centers are in the ground state but not when they are in an excited state. This sort of grating would be adapted to handling visible and ultraviolet radiation, since the effect of the color centers on high frequencies is less when the centers are in the excited state than when they are in the ground state.

What is claimed is:

1. An optical switch for switching a beam of radiation of a predetermined wavelength from a first direction of propagation to a second direction of propagation comprising:

a material having color centers disposed in a pattern, said pattern creating a diffraction grating for diffracting radiation of said predetermined wavelength, said color centers having a ground state, an excited state and a frequency-dependent index of refraction that has a value that is substantially different when said color centers are in said ground state from the value of said index of refraction when said color centers are in said excited state, whereby said diffraction grating has a diffraction efficiency for diffracting radiation of said predetermined wavelength that has a value that is substantially different when said color centers are in said ground state from the value of said diffraction efficiency when said color centers are in said excited state, said diffraction grating being positioned so as to intercept said beam of radiation and being oriented at an acute angle with respect to said first direction, and radiation means for irradiating said diffraction grating with further switching radiation, said further switching radiation having the property of exciting said color centers from said ground state to said excited state, which excitation changes the diffraction efficiency of said diffraction grating, whereby said beam of radiation may be switched between said first direction and said second direction.

2. An optical switch according to claim 1 in which said pattern comprises parallel planes spaced uniformly throughout a medium to form a diffraction grating, which parallel planes are separated by a distance that satisfies Bragg's law.

3. An optical switch according to claim 2, in which said medium is an alkali halide crystal.

4. An optical switch according to claim 1 in which said material having color centers is disposed in an alkali halide crystal and said pattern comprises an array of curved surfaces, whereby said beam of radiation may be focused as well as altered in direction.

5. A device for shaping a pulse of radiation comprising:

a first switchable diffraction grating having a first ground state and a first excited state for switching a beam of radiation of a predetermined wavelength from a first direction to a second direction, a second switchable diffraction grating having a second ground state and a second excited state, disposed along said second direction, for switching a beam of radiation of said predetermined wavelength travelling along said second direction to a third direction, and means for exciting said first switchable diffraction grating from said first ground state to said first excited state, and for exciting said second switchable diffraction grating from said second ground state to said second excited state at a predetermined time after said first switchable grating is excited whereby a pulse of radiation is formed, travelling along said second direction.

6. A device for shaping a pulse of radiation according to claim 5 in which at least one of said first and second switchable diffraction gratings is composed of an array of color centers in an alkali halide crystal.

7. A device for shaping a pulse of radiation comprising:

a switchable diffraction grating having a ground state and an excited state, for switching a beam of radiation of a predetermined wavelength from a first direction to a second direction, means for exciting said switchable diffraction grating from said ground state to said excited state, and means for stimulating the transition of said switchable diffraction grating from said excited state to said ground state, whereby a beam of radiation may be switched from said first direction to said second direction when said diffraction grating is excited and may be switched back to said first direction when said transition from said excited state to said ground state is stimulated.

8. A laser comprising:

a gain medium for generating radiation of a predetermined wavelength, means for creating a population inversion in said gain medium, and first and second means for resonating radiation of said predetermined wavelength in said gain medium, characterized in that at least one of said first and second means for resonating radiation in said medium includes a Bragg diffraction grating formed from an array of elements positioned to reflect radiation of said predetermined wavelength, said elements having a ground state and an excited state, and means for exciting said material from said ground state to said excited state.

9. A laser according to claim 8 in which said Bragg diffraction grating is formed from an array of color centers in an alkali halide crystal.

10. A laser according to claim 9 in which said gain medium is $CO_2$.

* * * * *